(12) United States Patent
Diosdado Borrego et al.

(10) Patent No.: US 11,654,488 B2
(45) Date of Patent: May 23, 2023

(54) BUILD MATERIAL TRANSPORTATION WITH ROTATIONAL LATCH

(71) Applicant: HEWLETT-PACKARD DEVELOPMENT COMPANY, L.P., Spring, TX (US)

(72) Inventors: Jorge Diosdado Borrego, Sant Cugat del Valles (ES); David Chanclon Fernandez, Sant Cugat del Valles (ES); Pablo Antonio Murciego Rodriguez, Sant Cugat del Valles (ES)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 46 days.

(21) Appl. No.: 17/316,966

(22) Filed: May 11, 2021

(65) Prior Publication Data
US 2022/0362855 A1    Nov. 17, 2022

(51) Int. Cl.
*B29C 64/00* (2017.01)
*B22F 10/73* (2021.01)
(Continued)

(52) U.S. Cl.
CPC ........ *B22F 10/73* (2021.01); *B01D 67/00045* (2022.08); *B01D 67/00415* (2022.08); *B22F 10/00* (2021.01); *B22F 10/14* (2021.01); *B22F 10/85* (2021.01); *B22F 12/00* (2021.01); *B22F 12/224* (2021.01); *B22F 12/30* (2021.01); *B22F 12/50* (2021.01); *B22F 12/70* (2021.01); *B22F 12/82* (2021.01); *B29C 64/00* (2017.08); *B29C 64/10* (2017.08); *B29C 64/176* (2017.08); *B29C 64/182* (2017.08); *B29C 64/20* (2017.08); *B29C 64/205* (2017.08); *B29C 64/227* (2017.08); *B29C 64/30* (2017.08); *B29C 64/307* (2017.08); *B29C 64/393* (2017.08); *B29C 64/40* (2017.08); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12);
(Continued)

(58) Field of Classification Search
CPC ................................. B22F 10/73; B33Y 10/00
See application file for complete search history.

(56) References Cited

U.S. PATENT DOCUMENTS 3,780,877 A * 12/1973 Levitt ..................... B66C 13/18
                                                          294/81.4
2010/0025556 A1* 2/2010 Rogers .................... E04G 7/301
                                                           248/296.1
(Continued)

*Primary Examiner* — Nicholas R Krasnow
(74) *Attorney, Agent, or Firm* — Shook, Hardy & Bacon L.L.P.

(57) ABSTRACT

In one example in accordance with the present disclosure, a build material volume transportation device is described. The build material volume transportation device includes a shuttle to transport a build material volume. The shuttle includes an opening therethrough to receive the build material volume. The build material volume transportation device also includes a build tray to raise the build volume into the opening in the shuttle. The build material volume transportation device further includes a latch assembly to releasably secure the build tray to the shuttle. A tip of the latch assembly extends to interface with the aperture to secure the build tray to the shuttle. The tip rotates independently of the piston.

15 Claims, 12 Drawing Sheets

(51) Int. Cl.

| | |
|---|---|
| *B22F 10/14* | (2021.01) |
| *B22F 12/30* | (2021.01) |
| *B22F 12/70* | (2021.01) |
| *B33Y 40/00* | (2020.01) |
| *B22F 12/50* | (2021.01) |
| *B33Y 10/00* | (2015.01) |
| *B33Y 30/00* | (2015.01) |
| *B22F 12/00* | (2021.01) |
| *B33Y 50/00* | (2015.01) |
| *B29C 64/227* | (2017.01) |
| *B29C 64/30* | (2017.01) |
| *B29C 64/40* | (2017.01) |
| *B01D 67/00* | (2006.01) |
| *B29C 64/182* | (2017.01) |
| *B33Y 40/20* | (2020.01) |
| *B33Y 70/00* | (2020.01) |
| *B29C 64/307* | (2017.01) |
| *B29C 64/393* | (2017.01) |
| *B22F 12/82* | (2021.01) |
| *B29C 64/20* | (2017.01) |
| *B33Y 40/10* | (2020.01) |
| *B33Y 99/00* | (2015.01) |
| *B22F 10/00* | (2021.01) |
| *B33Y 80/00* | (2015.01) |
| *B22F 10/85* | (2021.01) |
| *B29C 64/205* | (2017.01) |
| *B33Y 50/02* | (2015.01) |
| *B29C 64/176* | (2017.01) |
| *B29C 64/10* | (2017.01) |

(52) U.S. Cl.
CPC .............. *B33Y 50/02* (2014.12); *B33Y 70/00* (2014.12); *B33Y 80/00* (2014.12); *B33Y 99/00* (2014.12); *G03G 2215/2054* (2013.01); *G05B 2219/49023* (2013.01); *G05B 2219/49246* (2013.01); *Y10T 156/1722* (2015.01); *Y10T 156/1798* (2015.01)

(56) References Cited

U.S. PATENT DOCUMENTS

| | | | | |
|---|---|---|---|---|
| 2012/0119399 | A1* | 5/2012 | Fruth | B29C 64/245 |
| | | | | 425/186 |
| 2015/0368052 | A1* | 12/2015 | Sheesley | B65G 65/40 |
| | | | | 220/562 |
| 2016/0318253 | A1* | 11/2016 | Barnhart | B29C 64/153 |
| 2018/0051735 | A1* | 2/2018 | Stenyakin | F16B 21/09 |

* cited by examiner

BUILD MATERIAL TRANSPORTATION WITH ROTATIONAL LATCH

BACKGROUND

Additive manufacturing systems produce three-dimensional (3D) objects by building up layers of material. Some additive manufacturing systems are referred to as "3D printing devices" and use inkjet or other printing technology to apply print agents layers of a particulate build material. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
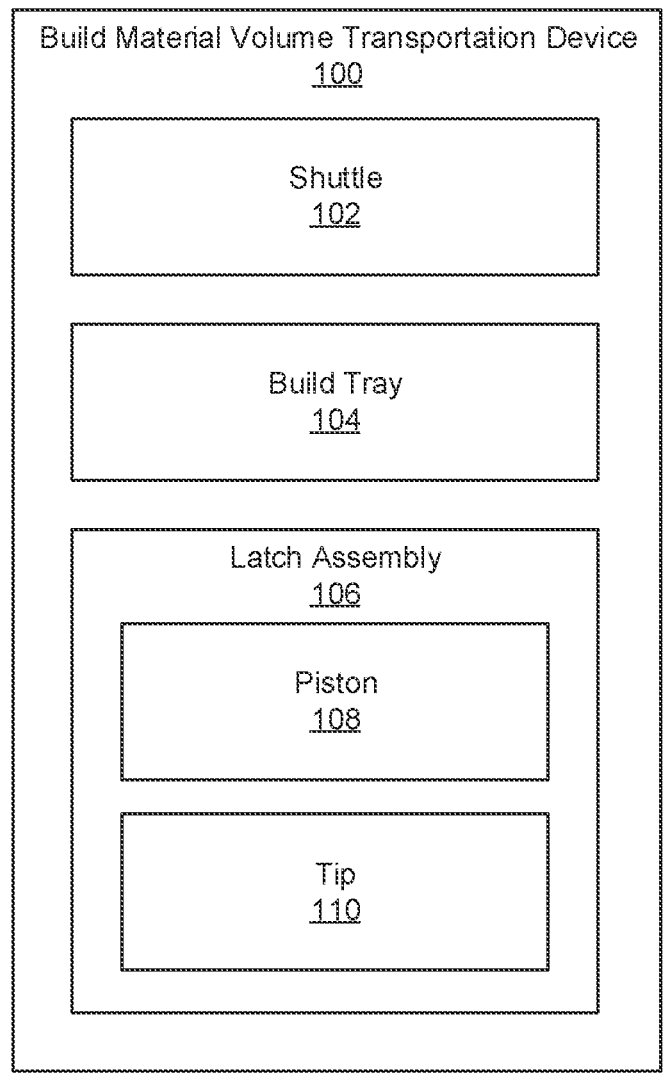
FIG. 1 is a block diagram of a build material volume transportation device with a rotating latch assembly, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems form a three-dimensional (3D) object through the solidification of layers of build material. Additive manufacturing systems make objects based on data in a 3D model of the object generated, for example, with a computer-aided drafting (CAD) computer program product. The model data is processed into slices, each slice defining portions of a layer of build material that are to be solidified.

In one particular example, a powder build material is deposited to form a layer and a binding agent is selectively applied to the layer of powder build material. The binding agent is deposited in a pattern based on a slice of a 3D object to be printed and is to selectively glue metal build particles together. This process is repeated per layer until all layers have been processed. Such a binding-agent-based system may be used to generate metallic or ceramic 3D objects.

With a 3D object formed, the binding agent is cured, for example via heating, to form a "green" 3D object. Cured binding agent holds the build material of the green object together. When activated or cured, the binding component glues the powder build material particles into the cured green object shape. The cured green object has enough mechanical strength such that it is able to withstand extraction from the build material platform without being deleteriously affected (e.g., the shape is not lost).

The green 3D object may then be placed in an oven to expose the green 3D object to heat to sinter the build material in the green 3D object to form the finished 3D object. During the sintering process all or substantially all of the binding agent may be removed (e.g., is 'burned off').

In another example, to form a 3D object out of plastic material, a build material, which may be powder, is deposited on a bed. A fusing agent is then dispensed onto portions of a layer of build material that are to be fused to form a layer of the 3D object. The system that carries out this type of additive manufacturing may be referred to as a powder and fusing agent-based system. The fusing agent disposed in the desired pattern increases the energy absorption of the layer of build material on which the agent is disposed. The build material is then exposed to energy such as electromagnetic radiation. The electromagnetic radiation may include infrared light, ultraviolet light, laser light, or other suitable electromagnetic radiation. Due to the increased heat absorption imparted by the fusing agent, those portions of the build material that have the fusing agent disposed thereon heat to a temperature greater than the fusing temperature for the build material.

Accordingly, as energy is applied to a surface of the build material, the build material that has received the fusing agent, and therefore has increased energy absorption, heats up sufficiently to cause powder particles to coalesce/fuse together while that portion of the build material that has not received the fusing agent remains in powder form. This process is repeated in a layer-wise fashion to generate a 3D object. The unfused portions of material can then be separated from the fused portions, and the unfused portions recycled for subsequent 3D formation operations.

In yet another example, a laser, or other power source is selectively aimed at a powder build material, or a layer of a powder build material, to form a slice of a 3D printed part. Such a process may be referred to as selective laser sintering. In yet another example, the additive manufacturing process may use selective laser melting where portions of the powder material, which may be metallic, are selectively melted together to form a slice of a 3D printed part. As yet another example, in fused deposition modeling melted build material is selectively deposited in a layer where it cools. As it cools it solidifies and adheres to a previous layer. This process is repeated to construct a 3D printed part.

In yet another example, the additive manufacturing process may involve using a light source to cure a liquid resin into a hard substance. Such an operation may be referred to as stereolithography. While such additive manufacturing operations have greatly expanded manufacturing and development possibilities, further development may make 3D printing a part of even more industries.

For example, regardless of the additive manufacturing process implemented, a printed 3D object may be subject to any number of post-processing operations. For example, a printed 3D object may have unfused or unbound build material semi-permanently adhered thereto. Moreover, the 3D object is formed on a build tray and resides in a bed of unfused build material. Removing the excess build material in which the 3D objects sit and a portion of which may be semi-permanently adhered to the 3D object, is referred to as decaking. Decaking may occur in a variety of stages. First, via a coarse decaking process, bulk build material is removed from around the 3D object and may be done via vibration and laminar flow among other techniques. With the bulk build material removed, the 3D object is more thoroughly cleaned to remove from the 3D object, any semi-permanently adhered build material, that does not form the 3D object. In an example, this may be done by blowing air across the 3D object in different directions and velocities.

Decaking can be a tedious and time-consuming manual process. Accordingly, the present system and methods describe an automatic decaking operation. Specifically, a 3D object may be formed on top of a detachable build tray. This build tray holds the cake, which is made up of the 3D object and non-solidified build material. The build tray holds the cake during the decaking actions. Following the post processing operation, the build tray may transport the 3D object to another location for additional post processing.

As the build tray is to be manipulated, i.e., coupled to a shuttle that transports the build tray and 3D object to another location, the present specification describes a system to couple to the build tray and secure the build tray to the shuttle.

However, as the build tray is a device that is present inside the build chamber where build material is deposited, it may become clogged with build material, such that coupling of the build tray to the shuttle becomes difficult. Accordingly, the present specification provides a latching system that secures the build tray to the shuttle and also removes powder between the latch assembly components to facilitate coupling.

Specifically, the present specification is directed to a latching assembly that includes a tip which is configured to drill through unfused powder in an aperture of the build tray. This tip removes powder build material, but also acts as a pin to retain the build tray to the shuttle during 3D object transportation. Over time, this tip may wear out. Based on the properties of the build material, it may be desirable to have tips with different physical characteristics. Accordingly, in an example the tip is interchangeable such that just the tip, rather than the whole shuttle, may be replaced due to wear or due to desiring a different tip more particularly suited for a build material being used.

Moreover, for use with some particular build materials, such as those that are uncompressible, the system may include an air delivery system to evacuate an aperture in the build tray that is to receive the tip.

Specifically, the present specification describes a build material volume transportation device. The device includes a shuttle to transport a build material volume. The shuttle includes an opening therethrough to receive the build material volume. The device also includes the build tray which raises the build volume into the opening in the shuttle. The device also includes a latch assembly to releasably secure the build tray to the shuttle. The latch assembly includes 1) a piston to extend a tip from the shuttle towards an aperture in the build platform and 2) the tip to interface with the aperture to secure the build tray to a housing of the shuttle. In this example, the tip rotates independently of the piston.

The present specification also describes a method. According to the method, a shuttle is arranged above a build tray on which a build material volume is disposed. The build tray is supported by a build platform. The build tray is raised to raise the build material volume into an opening of the shuttle. A tip of the latch assembly is extended into an aperture of the build tray to secure the build tray to the shuttle. The tip is to rotate relative to the piston about a longitudinal axis of the piston.

In another example, the build material volume transportation device includes the shuttle to transport a build material volume. The shuttle has an opening therethrough to receive the build material volume. The build material volume transportation device also includes a build tray to raise the build volume into the opening in the shuttle and the latch assembly to releasably secure the build tray to the shuttle. In this example, the latch assembly includes a housing, a piston to extend from the shuttle towards an aperture in the build tray, a tip on an end of the piston to interface with the aperture to secure the build tray to the shuttle, wherein the tip has a physical characteristic based on a build material used in an additive manufacturing system, and a helical slot to interface with a fixed pin on the housing to rotate the tip relative to the piston as the piston extends towards the aperture In summary, using such a build material volume transportation device 1) enables automation of post printing operations; 2) clears out the latching component to ensure a secure and rigid attachment of the build tray to a transporting shuttle; 3) provides interchangeability due to tip wear; and 4) provides flexibility in removing different types of build materials that may have different physical properties. However, the devices disclosed herein may address other matters and deficiencies in a number of technical areas.

As used in the present specification and in the appended claims, the term "a number of" or similar language is meant to be understood broadly as any positive number including 1 to infinity.

Turning now to the figures, FIG. 1 is a block diagram of a build material volume transportation device (100) with a rotating latch assembly (106), according to an example of the principles described herein. The build material volume transportation device (100) may be used to transport a build material volume, or "cake," that was built up during the additive manufacturing of the 3D object. That is, the additive manufacturing process uses build material which is spread over a build platform to form a build layer in a build chamber. Selected portions of the build layer may be solidified, for example by fusing, sintering, melting, binding or otherwise joining the build material using, for example, heat energy applied from an energy source and a binding agent. The build platform is then lowered by a predetermined amount and a new build layer is formed on the previously formed layer and the process repeated. In this way, the 3D object is created within a build cake which is made up of the 3D object and non-solidified build material.

The build material may be any suitable form of build material, for example fibers, granules or powders. The build material can include, for example, thermoplastic materials, ceramic material, and metallic materials. In some additive manufacturing processes, for example in some processes using metallic build materials, the 3D object within the build cake may be referred to as a green object as it may not be structurally robust until a further processing operation has been carried out, for example a sintering process.

As mentioned above, the build material volume transportation device (100) may be used to transport a build cake and 3D object. That is, after a 3D object is created through an additive manufacturing process, the 3D object and the build cake may be transported to a post processing location, or a plurality of post processing stations, where post-processing operations can be performed. Automating such transport may reduce manual intervention which may increase the economic viability of large-scale additive manufacturing.

Specifically, the build material volume transportation device (100) includes a shuttle (102) to transport a build material volume. In general, the shuttle (102) is moveable and as such is mounted to, and movable along, a rail by a chassis. The shuttle (102) has an opening therethrough to allow the build material volume to raise through. That is, the opening through the shuttle (102) is sized and shaped so that the build cake can be raised through a bottom of the opening into the shuttle (102).

The build material transportation device (100) further includes a build tray (104) to raise the build volume into the opening in the shuttle (102). That is, the build cake is arranged on a build tray (104). The build tray (104) includes a support surface which is secured on a frame. The build tray (104) is supported on a build platform within a build chamber. As described above, the build platform can be raised and lowered within the build chamber to raise and lower the build tray (104) and build cake thereon.

The build material volume transportation device (100) also includes a latch assembly (106) to releasably secure the build tray (104) to the shuttle (102). That is, during additive manufacturing the build tray (104) is not secured to the shuttle (102) as the build tray (104) moves up and down with in the build chamber. However, to transport the 3D object and build volume to other post processing stations, the latch assembly (106) secures the build tray (104) to the shuttle (102) such that the shuttle (102) may transport the build tray (104) to other locations for post processing. That is, the latch assembly (106) may engage with the build tray (104), for example through the frame in the build tray (104), to secure the build tray (104) to the shuttle (102).

The latch assembly (106) may include a number of components. For example, the latch assembly (106) may include a piston (108) to extend a tip (110) from the shuttle (102) towards an aperture in the build tray (104). That is, the latch assembly (106) may include a tip (110) that extends from the shuttle (102) and is inserted into an aperture in the build tray (104). The tip (110) interfaces with the aperture to secure the build tray (104) to the shuttle (102). In this example, the piston (108) may be a pneumatic piston (108). That is, the piston (108) may rely on air to move the piston (108) through its range of motion. As such, the piston (108) may be coupled to an air reservoir. Air in the reservoir may be compressed with a compressor and be coupled to the piston (108) such that air pressure moves the piston (108) underneath and perpendicular to the build tray (104), such that the tip (110) interfaces with the aperture. While particular reference is made to a pneumatic piston (108), the piston (108) may be a hydraulic piston (108), which relies on fluid force to move the piston (108).

As described above, it may be the case that the aperture, or the path to the aperture, is blocked by unfused build material as the build tray (104) resides in the build chamber during additive manufacturing. Accordingly, the tip (110) may rotate to "drill" out the unfused build material. Were the build material allowed to remain in the aperture or in the path, the tip (110) may not readily engage with the build tray (104) which could lead to complications or prevention of transport of the build tray (104) and 3D object. In particular cases, the lack of an effective and secure attachment of the build tray (104) to the shuttle (102) may result in damage to the 3D object.

In some examples, the tip (110) rotates independently of the piston (108). For example, the tip (110) may be interchangeable and removably attached to the piston (108) or may otherwise have a joint with the piston (108) that allows the tip to rotate (110) while the piston (108) does not. A single-piece rotating piston (108)/tip (110) may be complex to manufacture and subject to more frequent mechanical breakdown. Accordingly, having a tip (110) that independently rotates relative to the piston (110) enables longer mechanical life of the latch assembly (106). As depicted in FIGS. 2A-2I and 3, the build material volume transportation device (100) may include multiple latch assemblies (106).

In an example, the piston (108), and other components of the build material transportation device (100), are controlled by a controller which controls the operation of the build material volume transportation device (100) and may also control, or receive information from a controller which controls the additive manufacturing process which creates the 3D object.

FIGS. 2A-2I depict the operation of a build material volume transportation device (100) with a rotating latch assembly (106), according to examples of the principles described herein. As described above, in an example of an additive manufacturing process, a layer of build material may be formed in a build chamber (212). As used in the present specification and in the appended claims, the term "build chamber" refers to an area of space wherein the 3D objects (214-1, 214-2) are formed. Although not shown, an actuator, such as a piston, can control the vertical position of the build platform (216).

Figure 2A:
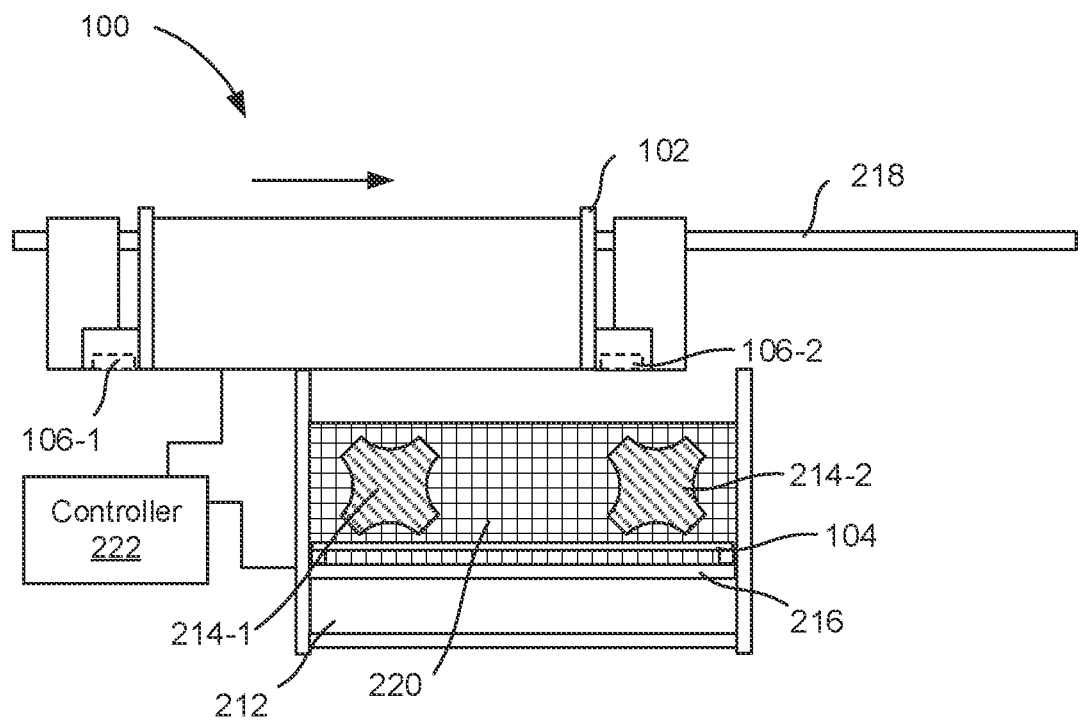
FIGS. 2A-2I depict the operation of a build material volume transportation device with a rotating latch assembly, according to examples of the principles described herein.

As described above, the build material volume transportation device (100) includes a shuttle (102) which is mounted to, and movable along a rail (218). In an example, the shuttle (102) may move in a plane, as opposed to along a line. In this example, the build platform may be stationary. As depicted in FIG. 2A, a bottom of the opening through the shuttle (102) is offset from the build chamber (212) as the shuttle (102) moves towards a collection position as indicated by the arrow. As depicted in FIG. 2A, the latch assemblies (106-1, 106-2) are in a retracted position so as to not impede the movement of the build volume (220) up into the shuttle (102) through the opening.

FIGS. 2A-2I also depict the controller (222) to operate the components of the build material volume transportation device (100), for example to raise and lower the build platform (216), activate the latch assembly (106), and move the shuttle (102), among other operations. The controller (222) may include various hardware components, which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller (222) cause the controller (222) to implement at least the functionality described herein.

Figure 2B:
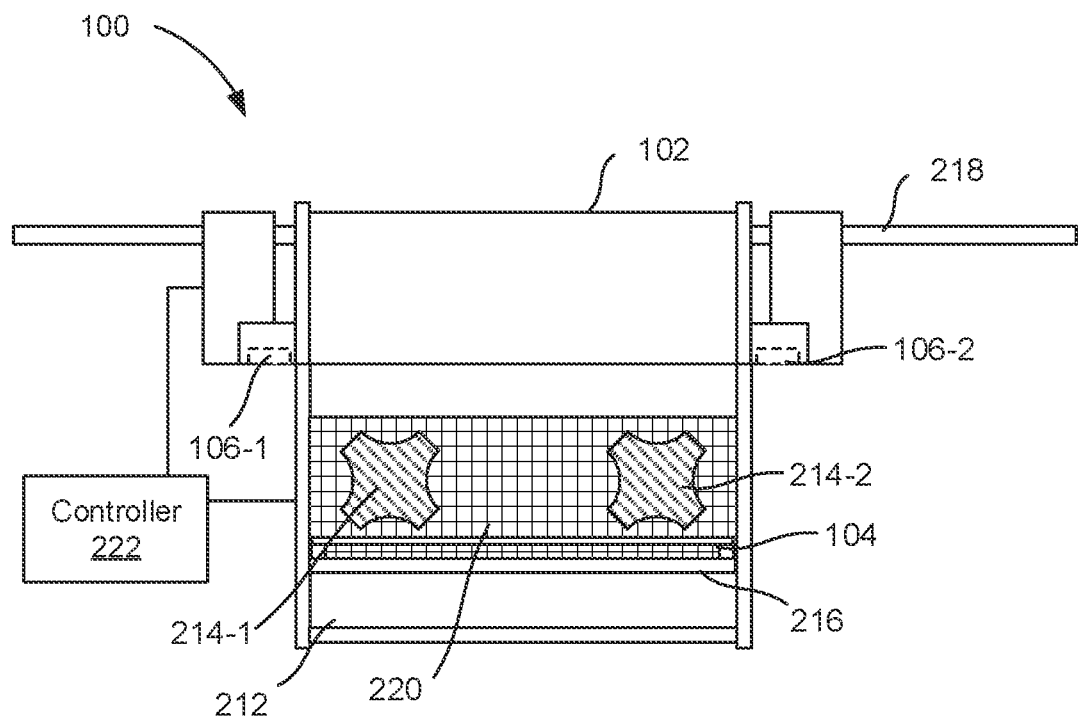

FIG. 2B depicts the shuttle (102) arranged above the build volume (220) so that the bottom of the opening through the shuttle (102) is aligned with the build chamber (212) in a collection position. As depicted in FIGS. 2A and 2B, the latch assemblies (106-1 106-2) are in a retracted position so as to not impede the movement of the build volume (220) up into the shuttle (102) through the opening. In FIGS. 2A and 2B, the latch assemblies (106) are depicted in dashed lines to indicate its position inside of the shuttle (102).

Figure 2C:
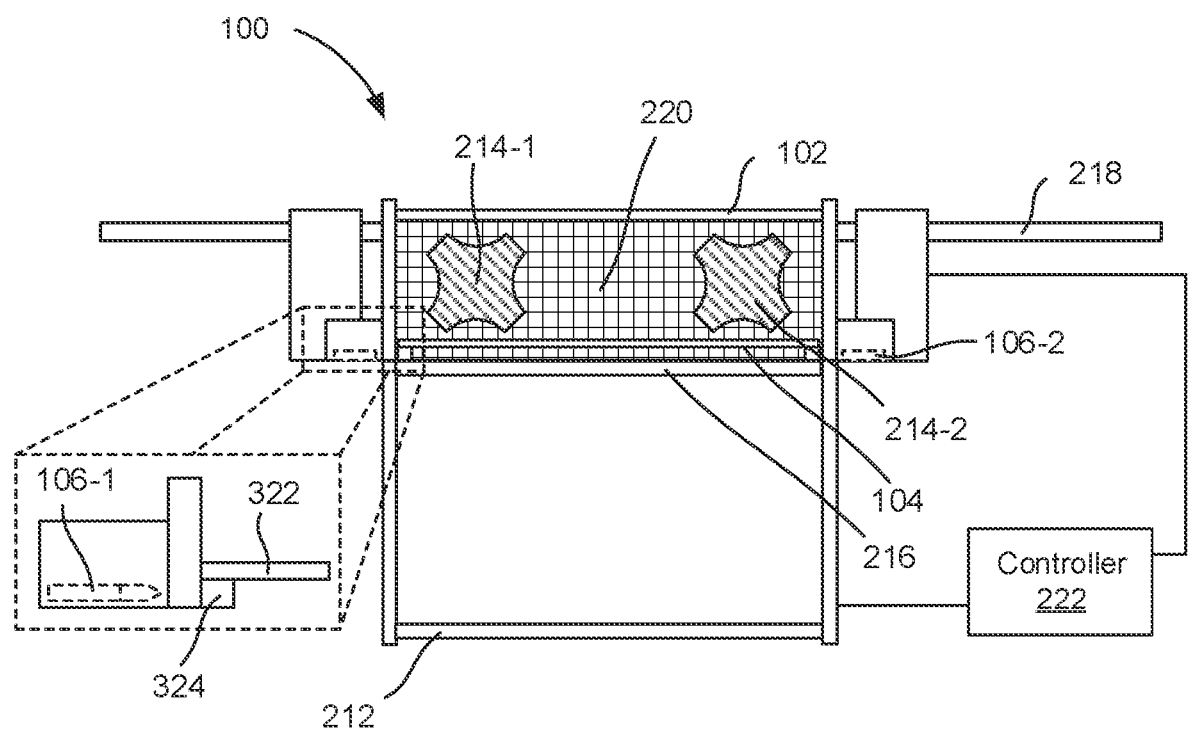

FIG. 2C depicts the position after the build platform (216) has raised the build volume (220) through the bottom of the opening and into the shuttle (102). More specifically, the build platform (216) has been raised to a top of the build chamber (212) so that the build platform (216) is substantially level with bottom of opening and the build tray (104) is located within the opening. As depicted in FIG. 2C, the latch assembly (106) remains in a retracted position so as to not impede the movement of the build tray (104) into the shuttle (102).

Figure 2D:
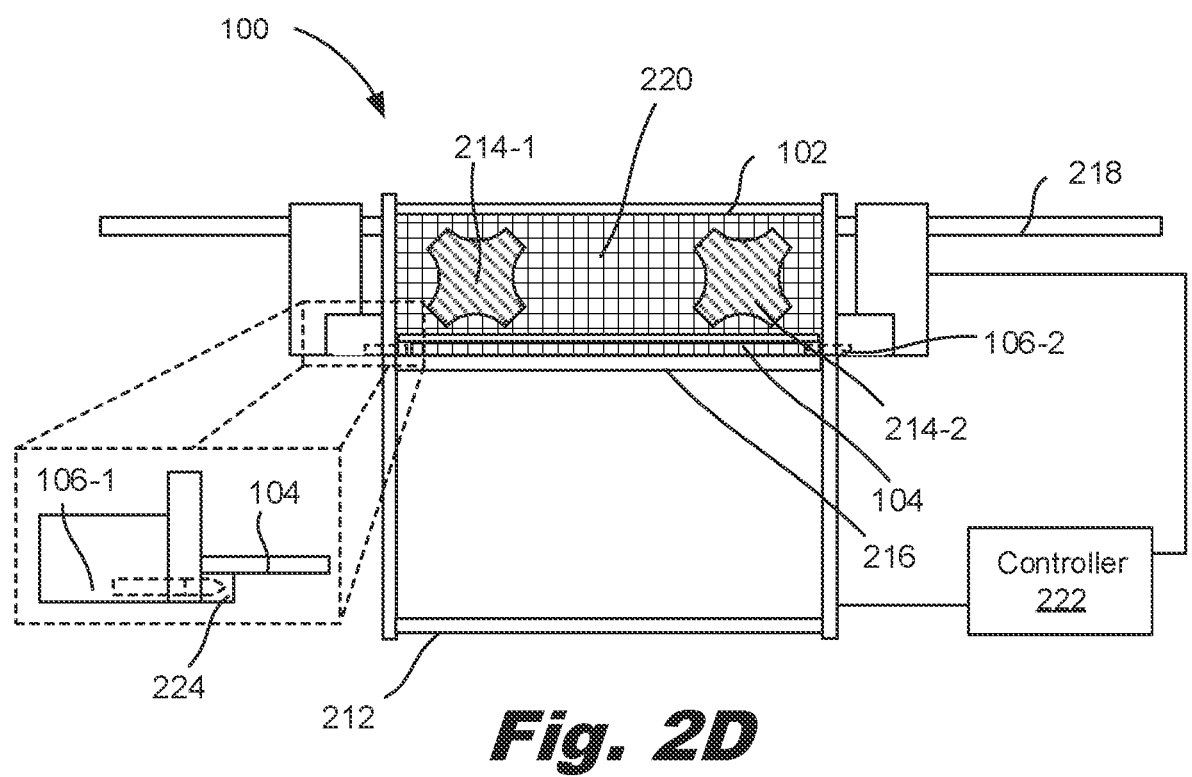

In FIG. 2D, the latch assembly (106) has been engaged such that the build tray (104) is secured to the shuttle (102). As depicted in FIG. 2D, the piston (FIG. 1, 108) and the tip (FIG. 1, 110) of the latch assembly (106) traverse perpendicular to a direction of travel of the build tray (104) and are disposed underneath the build tray (104) when securing the build tray (104) to the shuttle (102).

In an example, the latch assemblies (106) may be controlled by the controller (222) which controls the operation of the build material volume transportation device (100) and also controls the additive manufacturing process which creates the 3D object (214). In other examples, the controller (222) may not directly control the additive manufacturing process, but may receive information from, and provide instructions to a controller which controls the additive manufacturing process which creates the 3D object (214).

As depicted in FIGS. 2C and 2D, the latch assemblies (106) include a tip (FIG. 1, 110) which, as shown in FIG. 2C, is stored in a retracted position when the respective latch assembly (106) is not actuated. When actuated, the piston (FIG. 1, 108) extends the tip (FIG. 1, 110) through the inner wall of the shuttle (102) into a frame (324) of the build tray (104) and thereby secures the build tray (104) to the shuttle (102) as shown in FIG. 2D. In some examples, the tip (FIG. 1, 110) may have a geometry uniquely keyed to the aperture in the build tray (214). For example, the tip (FIG. 1, 110) may have a particular diameter to match the diameter of the aperture in the frame (324). Doing so may ensure the use of a target tip (FIG. 1, 110) with a particular build tray (104). For example, some unfused build material may be harder to evacuate from the aperture and thus may warrant a larger tip (FIG. 1, 110) with a tighter pitch of helical slots to more aggressively evacuate the build material. As such, a tip (FIG. 1, 110) may be selected that matches the aperture to ensure adequate build material removal. The geometry of the tip (FIG. 1, 100) may also be used to prevent the use a wrong material with a wrong depowder station. For example, a factory may have two stations, each dedicated to a different material. The alignment of aperture/tip (FIG. 1, 110) may be used to avoid using a wrong material in a particular station. The build tray frame (324) may also be interchangeable, so if a tip (FIG. 1, 110) or frame (324) become damaged, these components may individually be replaced, rather than the whole latch assembly (106) and build tray (214).

As described above, the tip (FIG. 1, 110) of the latch assembly (106) may rotate independently of the piston (FIG. 1, 108). That is, the piston (FIG. 1, 108) may not rotate, but the tip (FIG. 1, 110) may rotate. Rotation of the tip (FIG. 1, 110) as it extends towards the build tray (104) removes build material to ensure a secure attachment of the build tray (104) to the shuttle (102).

Figure 2E:
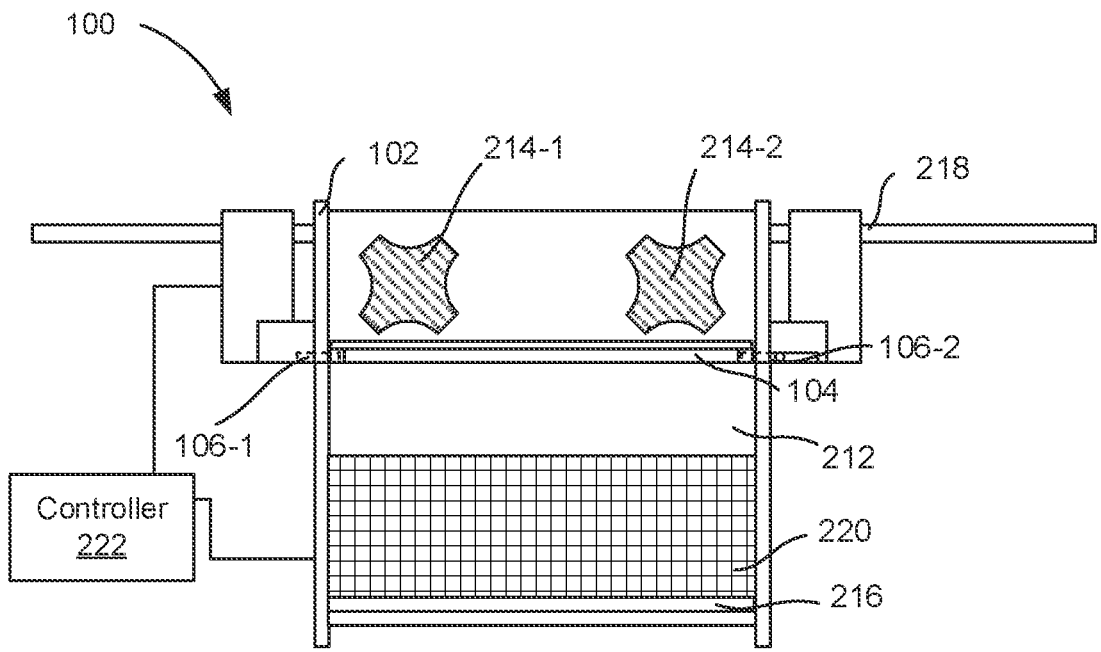

In FIG. 2E, the build platform (216) has been lowered to a position within the build chamber (212) leaving the build tray (104) held above the build platform (216) and coupled to the shuttle (102). In an example, the build tray (104) may include apertures such that non-solidified build material (220) may pass through openings in the support surface of the build tray (104) and fall onto the build platform (216) within the build chamber (212).

Figure 2F:
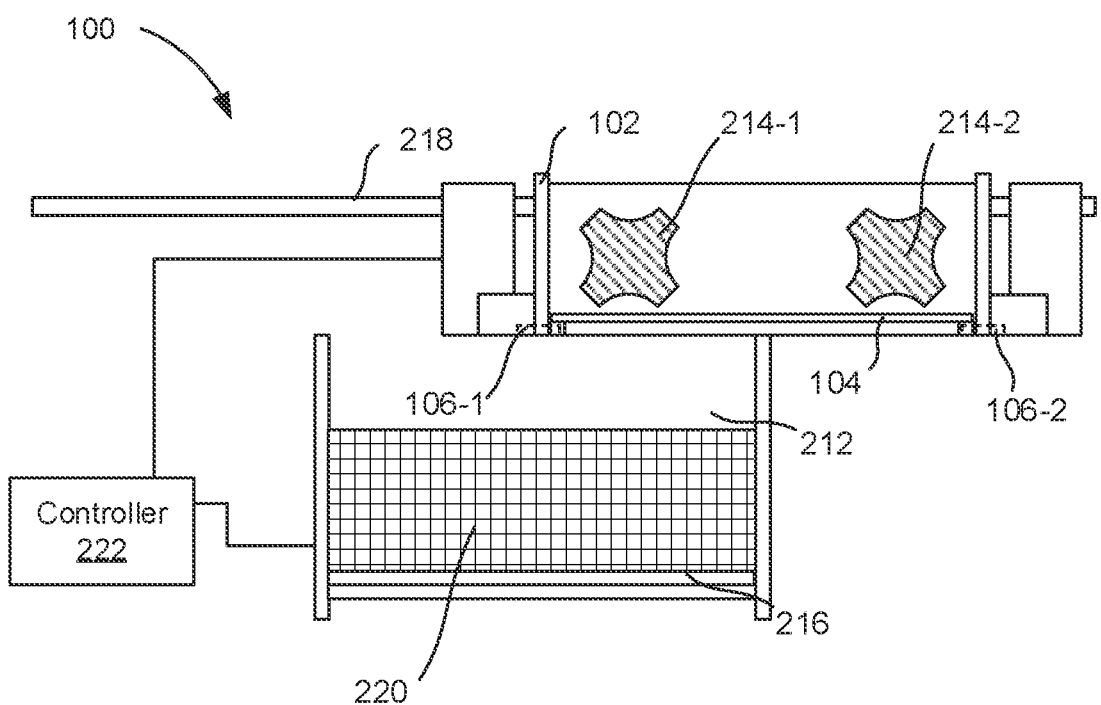

In some examples, the movement of the non-solidified build material (220) through the openings in the build tray (104) is initiated, sped up, or otherwise encouraged by vibrating a part of the shuttle (102). With non-solidified build material removed from the shuttle (102), the shuttle (102) may move away from the build chamber (212) as shown in FIG. 2F.

Figure 2G:
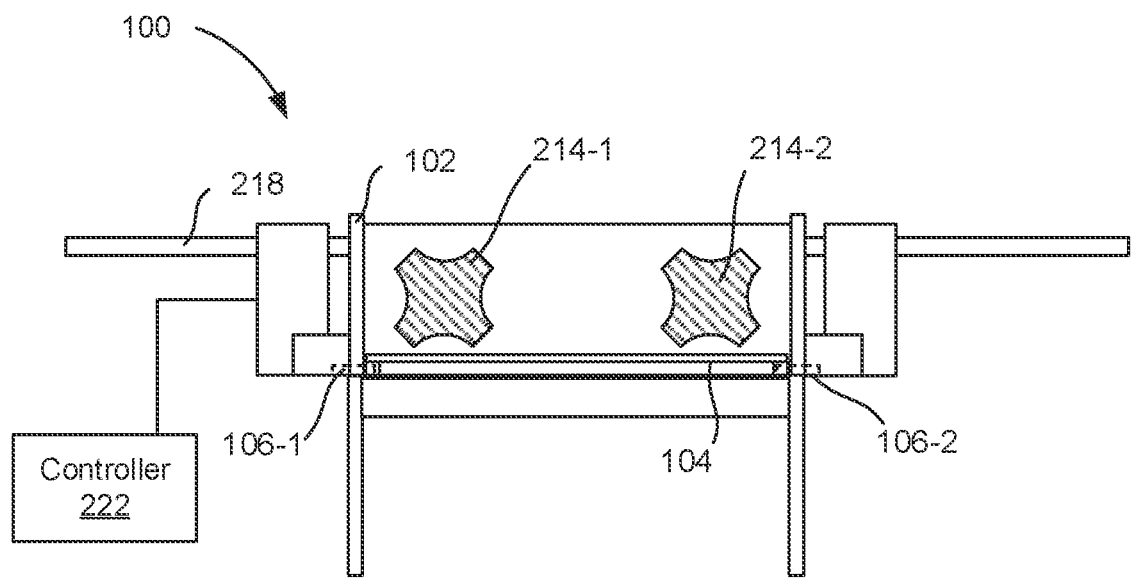
Figure 2H:
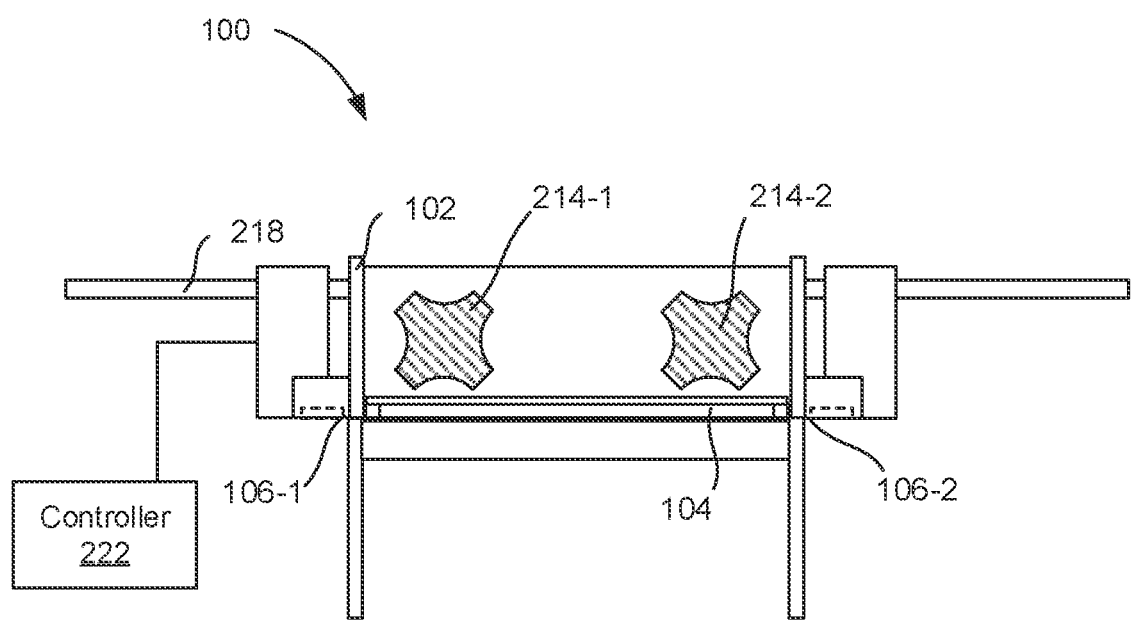
Figure 2I:
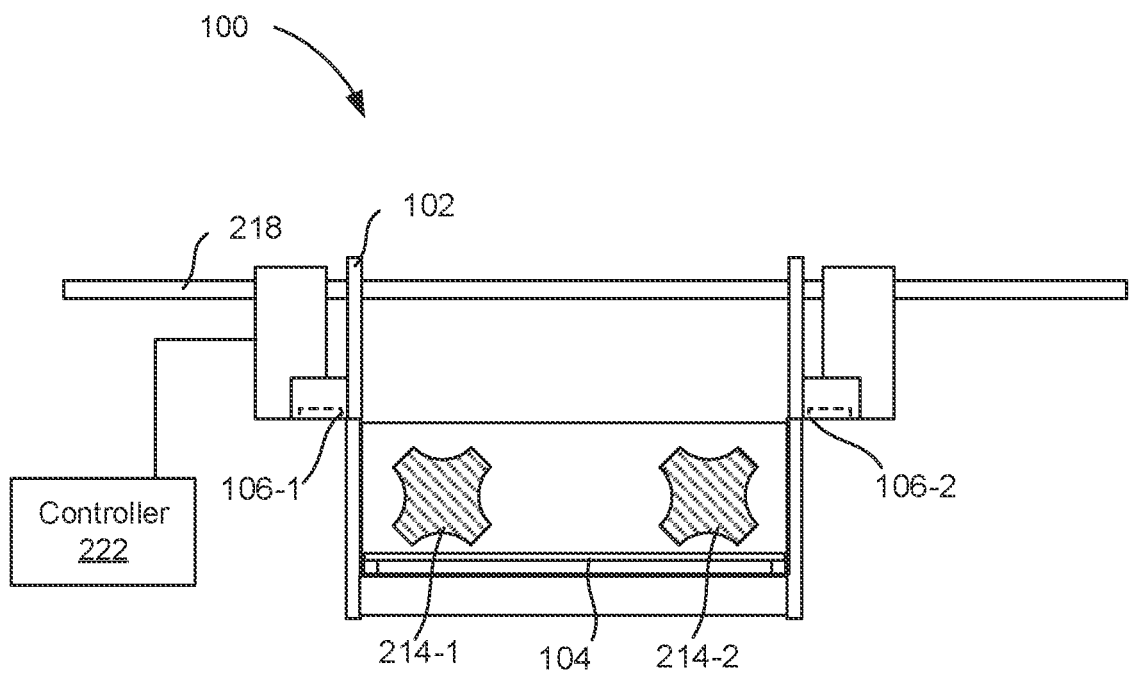

In FIG. 2G, the shuttle (102) has moved to a second location which is separated from the build chamber (FIG. 2A, 212). As depicted in FIG. 2H, the latch assemblies (106-1, 106-2) may be released and the build tray (214) may be lowered from the shuttle (102) to allow access to the 3D objects as depicted in FIG. 2I. That is, the tip (FIG. 1, 110) of each latch assembly (106) is moved into the retracted position as shown in FIG. 2H to release the build tray (104) from the shuttle (102). Separating the build tray (104) from the shuttle (102) allows the build tray (104) to be moved elsewhere, or a processing operation to be carried out.

Figure 3:
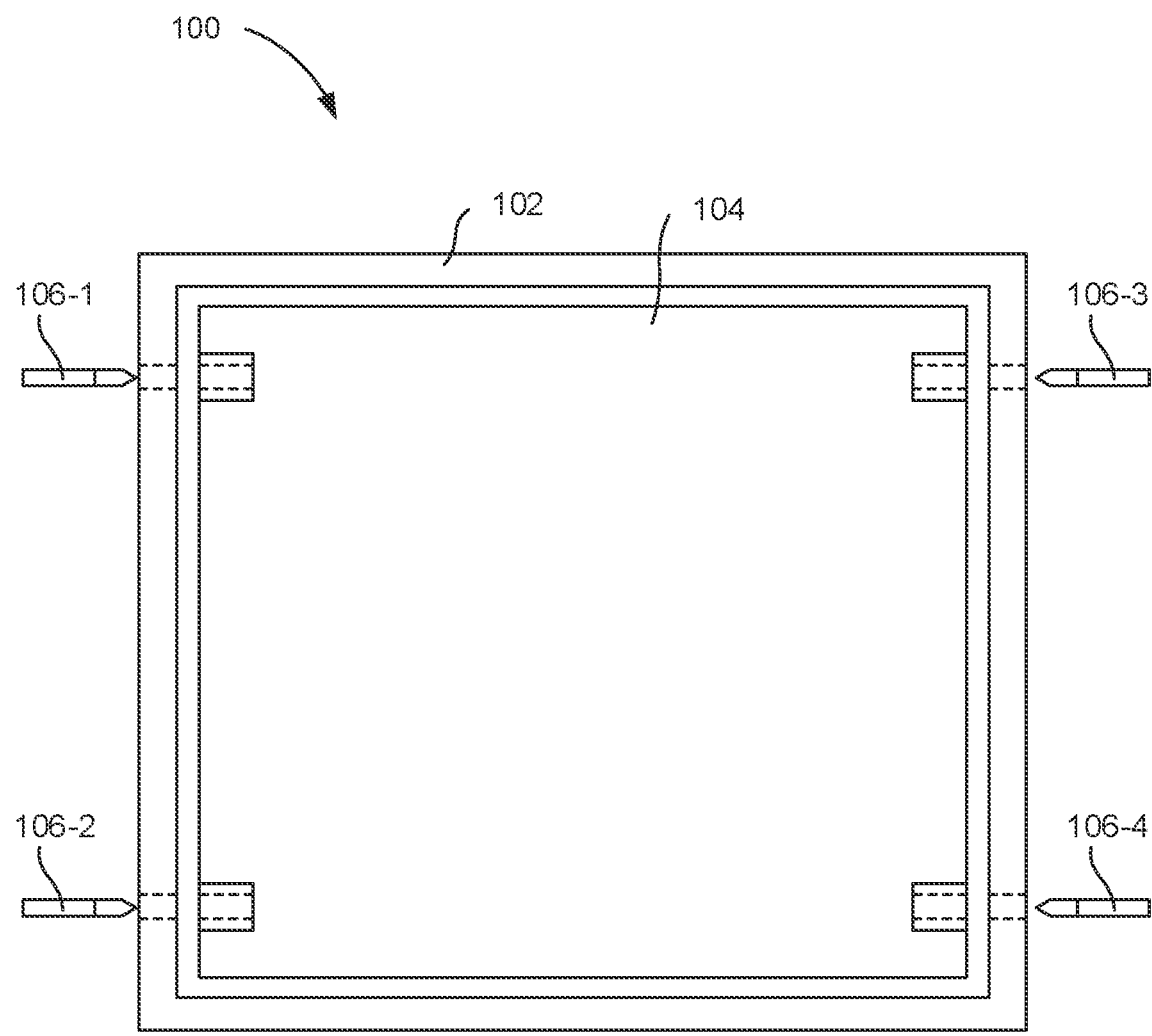
FIG. 3 is a top view of a build material volume transportation device with a rotating latch assembly, according to an example of the principles described herein.

FIG. 3 is a top view of a build material volume transportation device (100) with a rotating latch assembly (106), according to an example of the principles described herein. Specifically, FIG. 3 depicts the build material volume transportation device (100) with four latch assemblies (106-1, 106-2, 106-3, 106-4) to selectively secure the build tray (104) to the shuttle (102) for transportation of the 3D objects (FIG. 2A, 214) and build volume (FIG. 2A, 220) throughout an additive manufacturing and other systems.

Figure 4A:
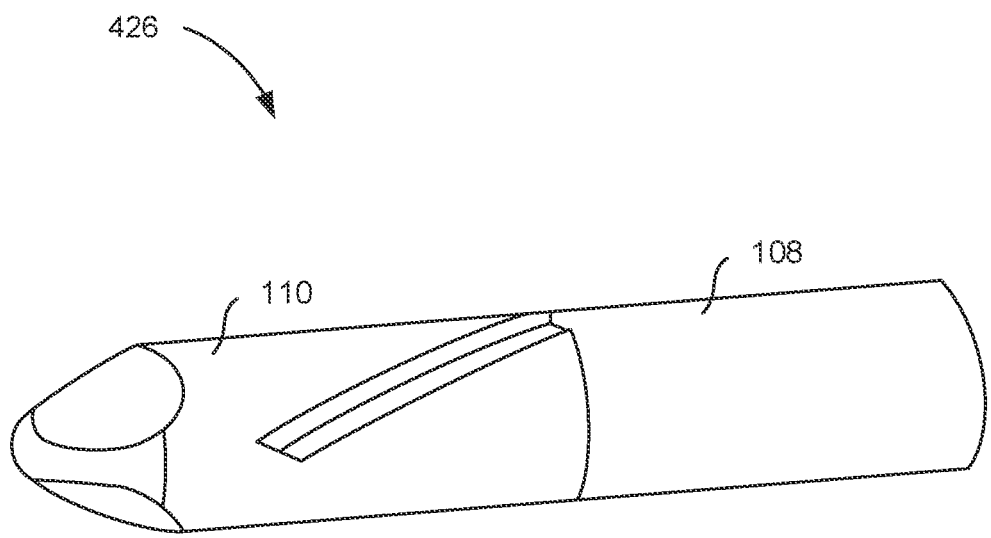
FIGS. 4A and 4B depict various rotating tips of the rotating latch assembly, according to an example of the principles described herein.
Figure 4B:
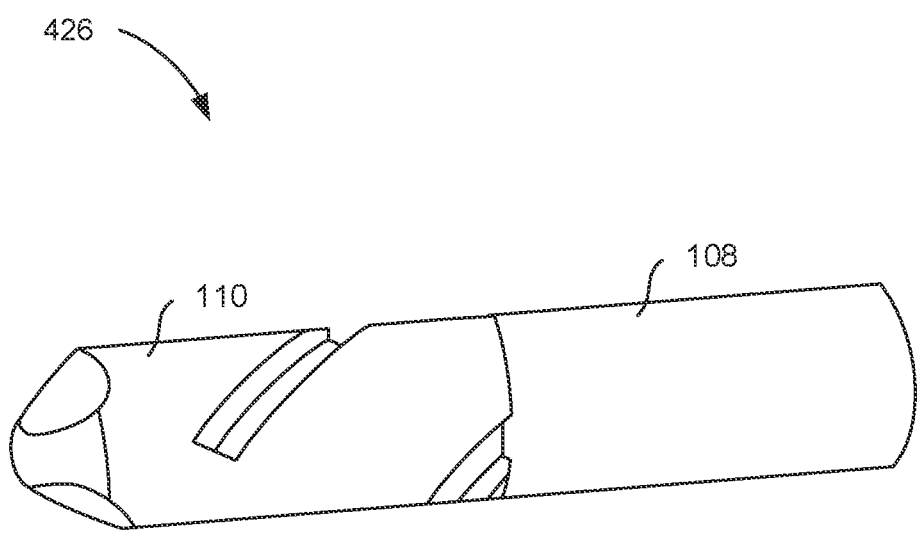

FIGS. 4A and 4B depict various rotating tips (110) of the rotating latch assembly (FIG. 1, 106), according to an example of the principles described herein. That is, the system (426) may include a set of interchangeable tips (110) that are installed on an end of a piston (108). Implementing interchangeable tips (110) may provide for greater flexibility in additive manufacturing. That is, over time tips (110) may wear out. Accordingly, by including a set of interchangeable tips (110) that may be removably attached to a piston (108), a single tip (110) may be replaced rather than replacing the entire system.

Figure 5:
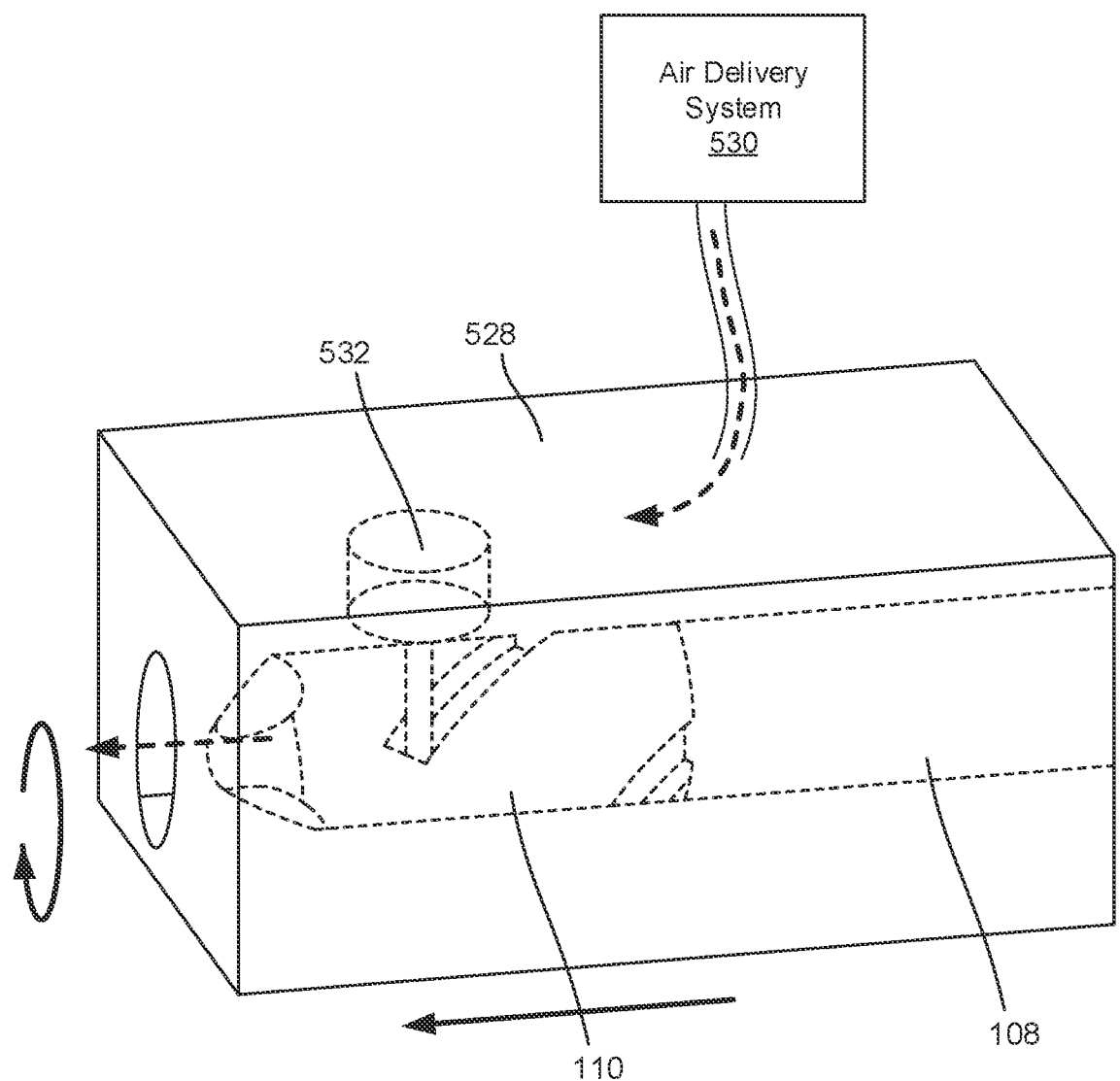
FIG. 5 depicts the rotating latch assembly, according to an example of the principles described herein.

In some examples, a physical characteristic of a tip (110) may be based on a build material used in the additive manufacturing system. For example, some build materials may be harder or heavier and thus may dictate a tip (110) with a different geometry. For example, the physical characteristic may be a pitch of a head of the interchangeable tip (110). As a specific example, FIG. 4A depicts a tip (110) with a sharper pitch as compared to the tip (110) of FIG. 4B. In another example, FIG. 4B depicts a tip (110) with a helical slot pitch that is tighter than the helical slot pitch of the tip depicted in FIG. 4A. As depicted in FIG. 5, the helical slot may interact with a fixed pin in a housing of the shuttle (FIG.

1, 102) to rotate the tip (110). Accordingly, a tip (110) with a tighter pitch helical slot may rotate faster than a tip (110) with a lower pitch. A tighter pitch helical slot may expel build material more quickly.

As a particular example, a tungsten build material may dictate a sharper tip (110) or some other particular geometrical feature to enhance removal of the tungsten material. While particular reference is made to particular physical characteristics, other physical characteristics such as a size and shape of a scoop on the end of the tip (110) and a tip (110) material may similarly be adjusted based on the build material to be used. While particular reference is made to particular physical characteristics, other physical characteristics of the tip (110) may be selected based on the build material, such as a geometry of the drilling edges, a number of drilling edges, a depth of the helical slot, and a number of rotations of the helical slot around the tip (110), among others.

As described above, implementing an interchangeable tip (110) facilitates greater flexibility in additive manufacturing. For example, as the rotation of the tip (110) is determined by the curvature of the helical slots, when a different material dictates more rotation to effectively remove the material, this can be accounted for by changing the tip (110).

The system (426) may also include the piston (108), which is coupled to the shuttle (FIG. 1, 102). As described above, the piston (108) translates underneath the build tray (104) to securely attach the build tray (104) to the shuttle (102). As the piston translates (108), it drives the tip (110). However, in some examples the piston (108) does not rotate, even though the tip does (110).

As described above, the piston (108) may be a pneumatic or hydraulic piston (108) that relies on air or fluid pressure to move the piston (108). As such, the piston (108) may be coupled to pneumatic or hydraulic components, such as reservoirs and/or compressors to provide the air or fluid pressure to the piston (108) to translate it. In one example, the system (426) may include a motor that drives the piston (108) and tip (110) into the aperture of the build tray (104). As the piston (108) translates laterally underneath the build tray (FIG. 1, 104), the helical slots in the tip (110) may engage with a fixed pin, such as that depicted in FIG. 5, to rotate the tip (110). The rotation of the tip (110) draws build material out of the aperture such that the aperture is clear and thus cleanly engaged with the tip (110) for build tray (104) transport.

FIG. 5 depicts the rotating latch assembly (FIG. 1, 106), according to an example of the principles described herein. As described above, the latch assembly (FIG. 1, 106) in a retracted state may be entirely within a housing (528) of the shuttle (102) so as to not interfere with a rising or lowering build tray (FIG. 1, 104). However, to secure the build tray (FIG. 1, 104) to the shuttle (102), the tip (110) may extend through the housing (528) of the shuttle (102).

The tip (110) may translate to extend into the build tray (FIG. 1, 104) and may also rotate to assist in the expulsion of powdered material along the path of the tip (110), such that the tip (110) may more completely interface with the build tray (104). Accordingly, the housing (528) of the shuttle (102) may include a fixed pin (532). In the example depicted in FIG. 5, the fixed pin (532), the tip (110), and the piston (108) are depicted in dashed lines to indicate their position internal to the housing (528) of the shuttle (102).

As described above, the tip (110) includes a helical slot that interfaces with the fixed pin (532) to rotate the tip (110) relative to the piston (108) as the piston (108) traverses. For example, as the piston (108) translates in the direction of the solid arrow, the fixed pin (532) slides along the helical slot of the tip (110). That is, the tip (110) may be coupled to the piston (108) in a manner that allows the tip (110) to rotate around the end of the piston (108). An example of such a connection is depicted below in connection with FIG. 7. Due to this interaction between the fixed pin (532) and the helical slot on the tip (110), the tip (110) rotates as it extends, thus acting as a drill to remove the build material.

FIG. 5 also depicts another feature of the build material transportation device (FIG. 1, 100). Specifically, the device may include an air delivery system (530) to direct air into the aperture to remove build material from the aperture. That is, the system as described above may remove compressible build material. However, other build materials may not be compressible and therefore are not as easily removed. In this example, the action of the tip (110) without an air delivery system (530) may compact the build material instead of evacuating it, which compaction may produce a bad grip and may ultimately result in a failed connection between the build tray (104) and the shuttle (102). Accordingly, the air delivery system (530) may draw air from a reservoir, or from the environment, and may include a pump to deliver the air to the housing (528). In an example, the air may pass through the opening in the shuttle (102) through which the tip (110) is to extend as depicted in FIG. 5. In another example, the tip (110) itself may include a channel through which the air passes. That is, the tip (110) may include a nozzle that is coupled to an air supply tube. In this example, as the tip (110) advances, the air stream also advances to blow more air out of the aperture to ensure a firm coupling of the build tray (104) to the shuttle (102). In an example, the air delivery system (530) may deliver air to clear the path independent of the latching operation. For example, the air delivery system (530) may operate prior to, or simultaneous to the latching operation to assist in clearing powder from the aperture. In addition to clearing the aperture of unfused build material, the air delivery system (530) may be used to perform other operations, such as blowing air across the cake as the build tray (104) is raised. Doing so may remove excess or semi-permanently fused build material away from the 3D object.

Figure 6:
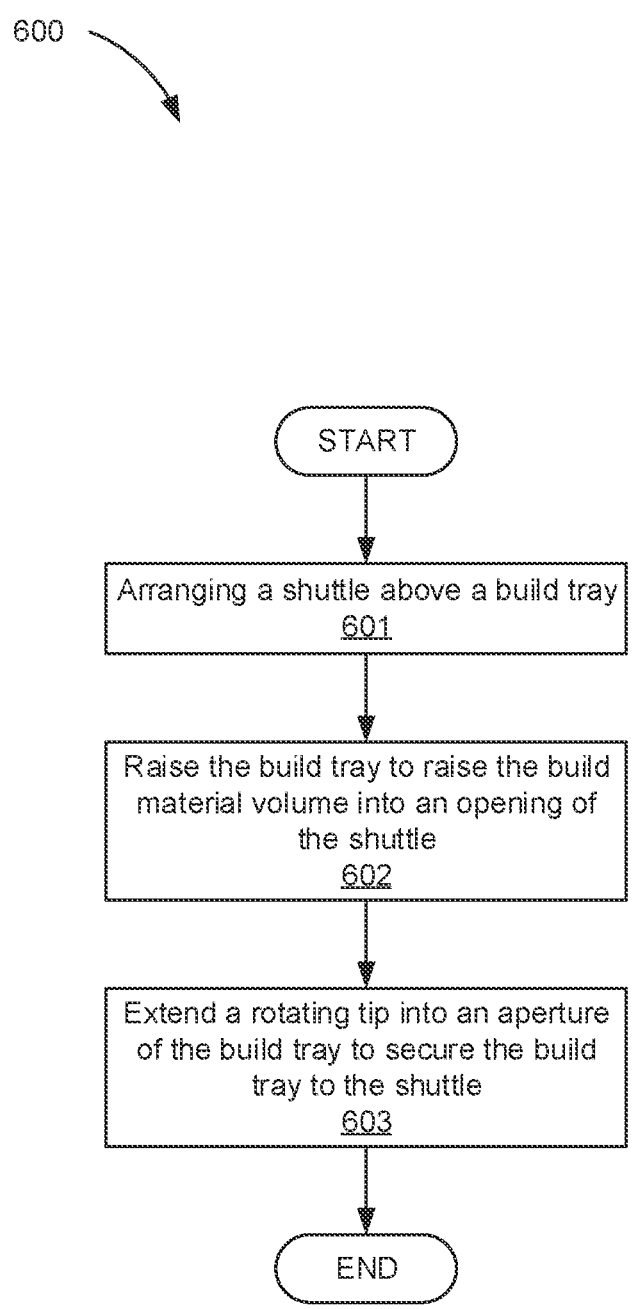
FIG. 6 is a flowchart of a method for operating a build material volume transportation device with a rotating latch assembly, according to an example of the principles described herein.

FIG. 6 is a flowchart of a method (600) for operating a build material volume transportation device (FIG. 1, 100) with a rotating latch assembly (FIG. 1, 106), according to an example of the principles described herein. According to the method (600), the shuttle (FIG. 1, 102) is arranged (block 601) above a build chamber (FIG. 2A, 212) within which a build volume (FIG. 2A, 220) and 3D object (FIG. 2A, 214) are supported on a build tray (FIG. 1, 104) that is supported by a build platform (FIG. 2A, 216). Doing so may facilitate loading of the build volume (FIG. 2A, 220) and 3D object (FIG. 2A, 214) into the shuttle (FIG. 1, 102). That is, the build tray (FIG. 1, 104) is raised (block 602), along with the build material volume (FIG. 2A, 220) into an opening of the shuttle (FIG. 1, 102).

The build tray (FIG. 1, 104) is then secured to the shuttle (FIG. 1, 102). That is, the tip (FIG. 1, 110) of the latch assembly (FIG. 1, 106) is extended into an aperture of the build tray (FIG. 1, 104). Specifically, via action of a piston (FIG. 1, 108), the piston (FIG. 1, 108) is translated laterally underneath the build tray (FIG. 1, 104). Simultaneously, the tip (FIG. 1, 110), which is rotatably mounted to an end of the piston, (FIG. 1, 108) rotates. This rotation draws build material out of the path that the tip (FIG. 1, 110) travels during mating with the build tray (FIG. 1, 104). As described above, while the tip (FIG. 1, 110) rotates, the piston (FIG. 1, 108) does not. The piston (FIG. 1, 108) translates to move the tip (FIG. 1, 110). The rotation of the tip (FIG. 1, 110) may be facilitated by a number of mechanisms, including an interface of a helical slot on the tip (FIG. 1, 110) with the fixed pin (FIG. 5, 532) in the housing of the shuttle (FIG. 1, 102).

The method as described herein secures the build tray (FIG. 1, 104) to the shuttle (FIG. 1, 102) such that it may be moved to different locations within the additive manufacturing system, for example for further processing.

Figure 7:
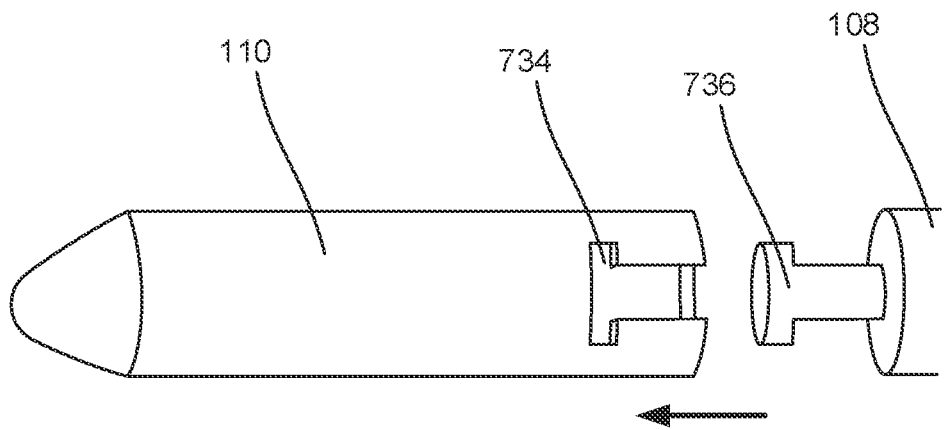
FIG. 7 depicts the junction of an interchangeable tip and the piston, according to an example of the principles described herein.

FIG. 7 depicts the junction of an interchangeable tip (110) and the piston (108), according to an example of the principles described herein. As described above, the tip (110) may be rotatably mounted to the piston (108). In this example, the tip (110) may be translationally coupled to the piston (108). That is, as the piston (108) translates laterally, the tip (110) may also translate laterally in the same direction. However, rotation of the tip (110) is decoupled from the piston (108). That is, even though the piston (108) does not rotate, the tip (110) may, for example based on the interaction between the fixed pin (FIG. 5, 532) and the helical slot on the tip (110). In one particular example, to enable the translationally coupled but rotationally decoupled motion, the tip (110) may include a keyed aperture (734) to match a geometry of a head (736) of the piston (108). Following passage of the keyed aperture (734) over the head (736) of the piston (108), the tip (110) may be free to rotate about the head (736) of the piston.

To translate in a first direction indicated by the arrow, the head (736) of the piston (108) presses against a top surface of the keyed aperture (734). To retract the tip (110), the piston (108) translates in a second and opposite direction. During this translation, the head pulls against a bottom surface of the keyed aperture (734), which bottom surface may be smaller than the T-shaped head (736) of the piston (108).

Figure 8:
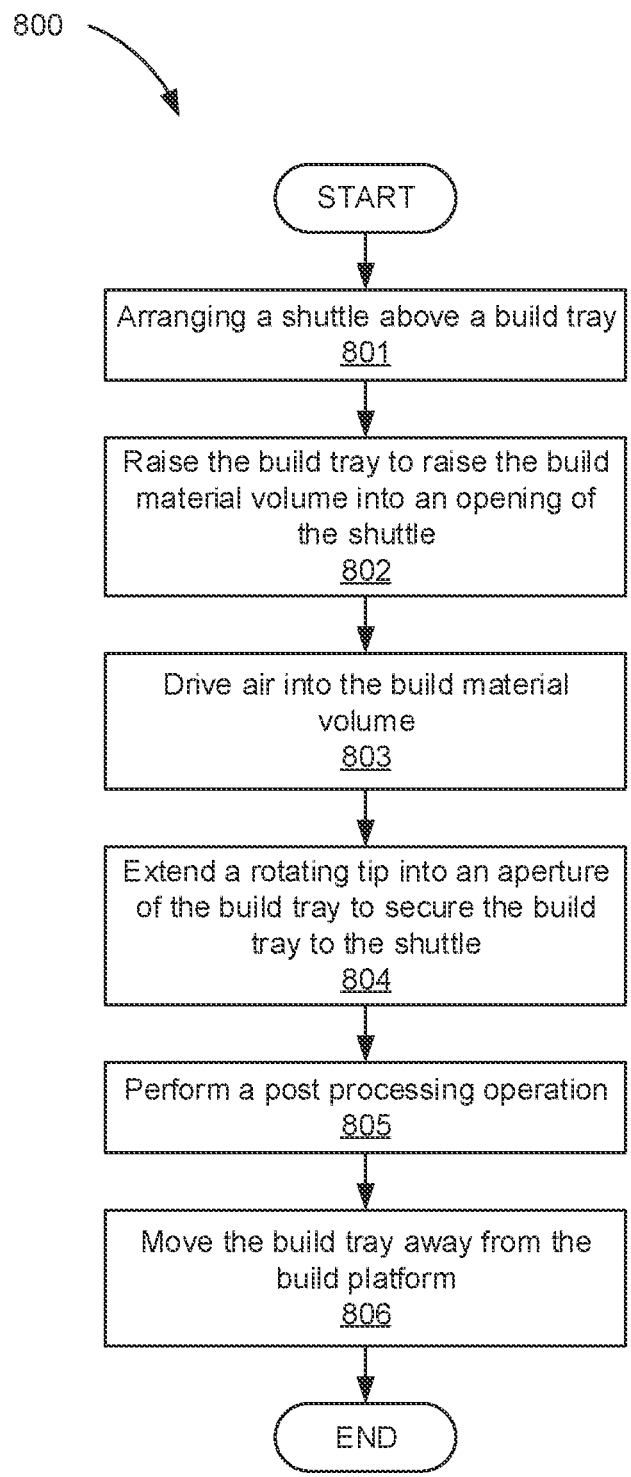
FIG. 8 is a flowchart of a method for operating a build material volume transportation device with a rotating latch assembly, according to an example of the principles described herein.

FIG. 8 is a flowchart of a method (800) for operating a build material volume transportation device (FIG. 1, 100) with a rotating latch assembly (FIG. 1, 106), according to an example of the principles described herein. The method (800) may include arranging (block 801) a shuttle (FIG. 1, 102) above a build tray (FIG. 1, 104) and raising (block 802) the built tray (FIG. 1, 104) to raise the build material volume into an opening of the shuttle (FIG. 1, 102). These operations may be performed as described above in connection with FIG. 6.

In an example, air is driven (block 803) into the build material volume to clean out the aperture. More specifically, the build tray (FIG. 1, 104) may include an aperture into which the tip (FIG. 1, 110) extends to secure the build tray (FIG. 1, 104) to the shuttle (FIG. 1, 102). As the build tray (FIG. 1, 104) is within the build chamber (FIG. 2A, 212), there may be build material along the path that the tip (FIG. 1, 110) as it secures the build tray (FIG. 1, 104) to the shuttle (FIG. 1, 102). The drilling motion of the tip (FIG. 1, 110) may remove some material and air driven into the build volume may evacuate more material to ensure an even greater interface between the tip (FIG. 1, 110) and the build tray (FIG. 1, 104).

Following or simultaneous to the driving (block 803) of air into the build material volume, the rotating tip (FIG. 1, 110) may be extended (block 804) into the aperture of the build tray (FIG. 1, 104) to secure the build tray (FIG. 1, 104) to the shuttle (FIG. 1, 102). This may be performed as described above in connection with FIG. 6.

In an example, with the build tray (FIG. 1, 104) coupled to the shuttle (FIG. 1, 102) and above the build chamber (FIG. 2A, 212), certain operations may be carried out on the build volume. For example, as described above, the build cake may include a 3D object (FIG. 2A, 214) and non-solidified build material (FIG. 2A, 220). Accordingly, the method (800) may include performing (block 805) a decaking operation while the shuttle (FIG. 1, 102) is disposed over the build platform (FIG. 2A, 216).

The method (800) may include performing other operations such as a quality assessment of the 3D object (FIG. 2A, 214), for example by carrying out measurements of the 3D object (FIG. 2A, 214). Further processing operations may also include storage, cleaning, polishing, sintering or the like. In these examples, the method (800) may include moving (block 806) the build tray (FIG. 1, 104) away from the build platform (FIG. 2A, 216) by moving the shuttle (FIG. 1, 102).

In summary, using such a build material volume transportation device 1) enables automation of post printing operations; 2) clears out the latching component to ensure a secure and rigid attachment of the build tray to a transporting shuttle; 3) provides interchangeability due to tip wear; and 4) provides flexibility in removing different types of build materials that may have different physical properties. However, the devices disclosed herein may address other matters and deficiencies in a number of technical areas.

What is claimed is:

1. A build material volume transportation device, comprising:
    a shuttle to transport a build material volume, the shuttle having an opening therethrough to receive the build material volume;
    a build tray to raise the build volume into the opening in the shuttle; and
    a latch assembly to releasably secure the build tray to the shuttle, the latch assembly comprising:
    a piston to extend a tip from the shuttle towards an aperture in the build tray; and
    the tip to interface with the aperture to secure the build tray to the shuttle, wherein the tip rotates independently of the piston.

2. The build material volume transportation device of claim 1, wherein the tip and piston are to traverse:
    perpendicular to a direction of travel of the build tray; and
    underneath the build tray.

3. The build material volume transportation device of claim 1, wherein the tip has a geometry uniquely keyed to the aperture in the build tray.

4. The build material volume transportation device of claim 1, wherein the tip comprises a keyed aperture to match a geometry of a head of the piston.

5. The build material volume transportation device of claim 4, wherein following passage of the keyed aperture over the head of the piston, the tip is to rotate to secure the tip in place on the head of the piston.

6. The build material volume transportation device of claim 1, further comprising an air delivery system to direct air into the aperture to remove build material from the aperture.

7. The build material volume transportation device of claim 6, wherein the tip comprises a nozzle to eject air into the aperture.

8. The build material volume transportation device of claim 1, further comprising a controller, the controller programmed for:
    arranging the shuttle above the build tray on which the build material volume is disposed, the build tray being supported by a build platform;

raising the build tray to raise the build material volume into the opening of the shuttle; and extending the tip of a latch assembly into the aperture of the build tray to secure the build tray to the shuttle, wherein the tip is to rotate relative to the piston about a longitudinal axis of the piston.

9. The build material volume transportation device of claim 8, the controller further programmed for performing a decaking operation while the shuttle is disposed over the build platform.

10. The build material volume transportation device of claim 8, the controller further programmed for moving the build tray away from the build platform by moving the shuttle.

11. The build material volume transportation device of claim 8, the controller further programmed for driving air into the build material volume to clean out the aperture.

12. A build material volume transportation device, comprising:
- a shuttle to transport a build material volume, the shuttle having an opening therethrough to receive the build material volume;
- a build tray to raise the build volume into the opening in the shuttle; and a latch system to releasably secure the build tray to the shuttle, the latch system comprising:
- a housing;
- a piston to extend from the shuttle towards an aperture in the build tray;
- a tip on an end of the piston to interface with the aperture to secure the build tray to the shuttle, wherein the tip comprises a physical characteristic based on a build material used in an additive manufacturing system; and
- a helical slot to interface with a fixed pin on the housing to rotate the tip relative to the piston as the piston extends towards the aperture, wherein the tip rotates independently of the piston.

13. The build material volume transportation device of claim 12, wherein the physical characteristic comprises a pitch of a helical slot along an outside of the interchangeable tip.

14. The build material volume transportation device of claim 12, wherein the physical characteristic comprises a pitch of a head of the interchangeable tip.

15. The build material volume transportation device of claim 12, further comprising an air delivery system to drive pressurized air into the build material volume through a tip nozzle.

* * * * *